Feb. 7, 1967 A. W. KELLY 3,303,223
PRODUCTION OF PHENOL FROM BENZENE VIA HALOBENZENE
Filed Sept. 12, 1960
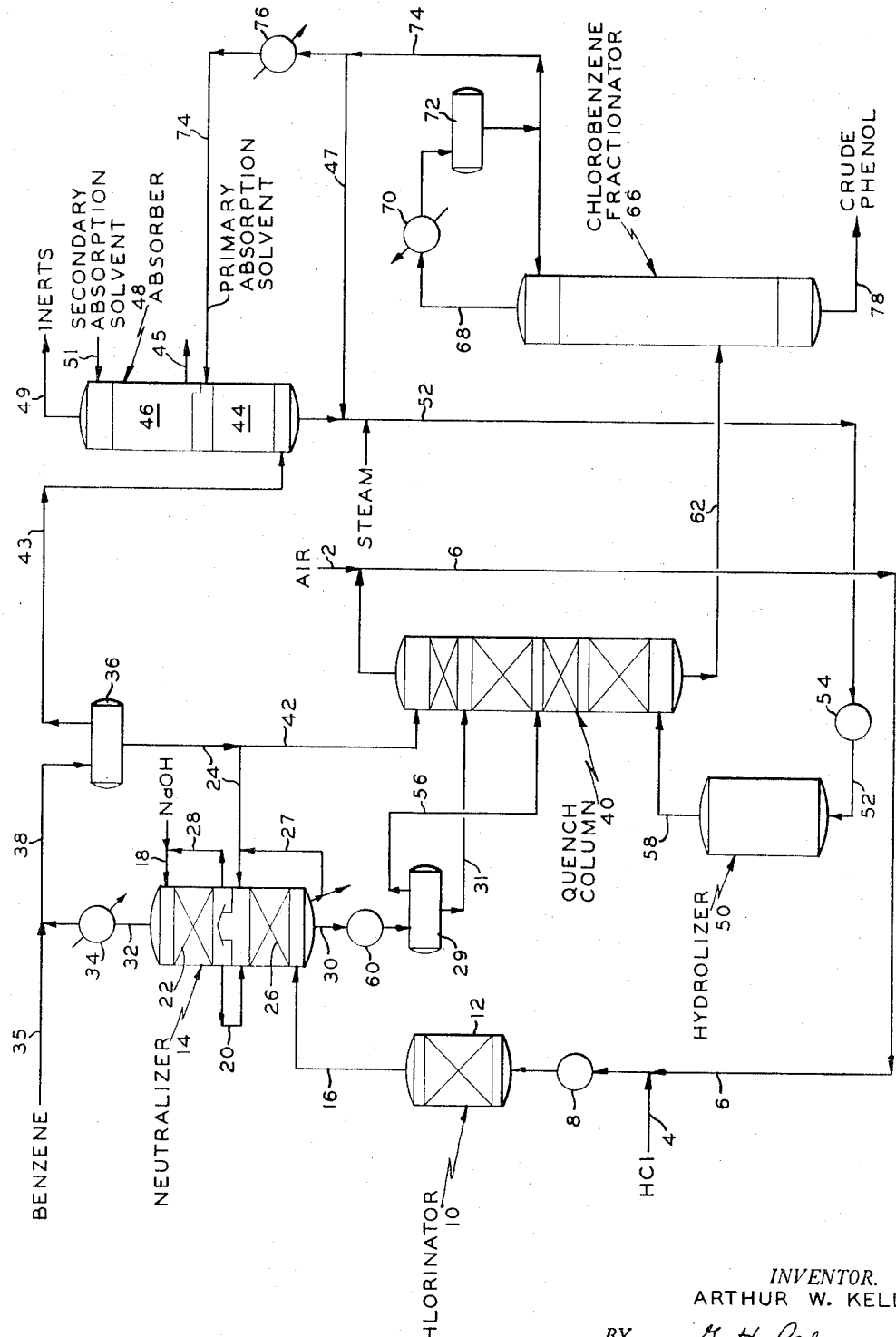
INVENTOR.
ARTHUR W. KELLY
BY  *D. H. Palmer*
ATTORNEY
*M. J. Mane*
AGENT

United States Patent Office 3,303,223
Patented Feb. 7, 1967

3,303,223
PRODUCTION OF PHENOL FROM BENZENE
VIA HALOBENZENE
Arthur W. Kelly, Palisades, N.Y., assignor to Pullman Incorporated, a corporation of Delaware
Filed Sept. 12, 1960, Ser. No. 55,214
20 Claims. (Cl. 260—629)

This invention relates to a process for the manufacture of phenols and more particularly to the production of phenol from a monohalobenzene.

One of the most important processes for producing phenol is the Raschig process which involves the conversion of benzene into chlorobenzene by the action of hydrogen chloride and air or oxygen according to the equation:

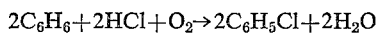

and the hydrolysis of the chlorobenzene product to phenol according to the equation:

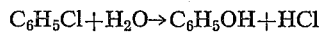

Although the chemistry of the above reactions appears to be simple, it is found in the prior art that when employing this method of producing phenol, many intricate process steps involving fractionations, special acid resistant equipment and temperature control devices must be employed.

In order to separate phenol from the products of these reactions and to overcome the difficulty of corrosive hydrogen chloride mixtures, several processes in the prior art have attempted to produce phenol according to the above equations by means of operations which totally condense the net vaporous products from the hydrolysis reaction of chlorobenzene. However, this method leaves much to be desired, since the separation of these products requires intricate processing steps involving special equipment such as blowers, liquid extraction columns, and acid resistant materials, such as glass pipe. In addition, the mechanical design of the special equipment required for use in the prior art has dictated the operation of the vaporous reactions at atmospheric pressure, or under vacuum, which requires excessively large piping and equipment.

It is, therefore, an object of the present invention to overcome the deficiencies of the above processes, while still providing an economical process for the production of phenol.

Another object of this invention is to provide a commercially feasible process for the production of phenol which avoids the necessity of conducting the synthesis at atmospheric pressure or under vacuum.

Another object of the above invention is to provide for the synthesis of phenol from a monohalobenzene in a process of simplified design.

Still another object of this invention is to avoid corrosion difficulties associated with the production of phenol by the Raschig process in the prior art.

These and other advantages of the present invention will become apparent to those skilled in the art from the following description and disclosure.

According to the process of the present invention, the synthesis of a phenol, such as for example, cresol, xylenol or trimethylphenol, phenol, is accomplished by reacting a benzene corresponding to the product with respect to methyl substitution and a hydrogen halide or halogen to produce a monohalobenzene; neutralizing the acidic components of the halogenation effluent; hydrolyzing the monohalobenzene to produce the desired phenol and hydrogen halide, and quenching the hydrolysis effluent so that the hydrogen halide-water mixture is retained in the vapor phase and at least the phenol is separated as a liquid. The acid is maintained in the vapor phase in the quenching zone, also referred to herein as the phenol condensation zone, by controlling the temperature in said zone so that the vaporous overhead fraction is maintained at or above the dew point of the hydrogen halide-water mixture and by providing the liquid benzene reactant to said zone for vaporization therein. Thus, the benzene is supplied as reflux to the phenol condensation zone and is provided in an amount such that the concentration of the benzene at any point in the phenol condensation zone is about equal to, and preferably in excess of, the concentration dictated by the heterogeneous azeotropic mixture of the benzene, halobenzene, water and hydrogen halide, most preferably an excess of not greater than 25 percent. Thus, the acid in the process of the present invention is maintained in a vaporous state, and the vaporization of aqueous acid halide, with accompanying problems of handling the corrosive liquid mixture, as in processes heretofore employed, is obviated.

For illustrative purposes and for simplicity of disclosure, the following description is restricted to the reaction of benzene and a halogen and subsequent hydrolysis of the resulting halobenzene to produce phenol. However, it is to be understood that the conditions and procedure set forth herein can be applied to the reaction of toluene, xylene, naphthalenes, diphenyls and other similar carbocyclic compounds in place of benzene to produce the corresponding halogenated derivative, and this halogenated derivative, for example monobromo- or monochloro-, toluene, can be hydrolyzed to produce the corresponding phenol, which is in the case just cited, cresol.

Generally the process of the present invention for producing phenol comprises halogenating benzene with a hydrogen halide or a halogen in a volume percent ratio of between about 15:1 and about 180:1 based on halogen, under a pressure of between 10 p.s.i.a. and about 300 p.s.i.g. in the vapor phase to provide a mixture comprising unconverted reactants and monohalobenzenes, together with water and inert materials which enter the halogenator from subsequent recycle and feed streams, hereinafter described. The vaporous halogenation effluent is removed from the halogenator, neutralized with a basic material to obviate the need for acid resistant equipment due to the corrosive properties of the halide acid. This neutralized mixture is separated into a liquid organc phase and a vaporous benzene-inerts phase by partially condensing the vapors, and the remaining vapors are treated for the removal of inert materials in a recovery zone from which inerts are vented to the atmosphere without loss of organic components.

The benzene recovery zone comprises any convenient system for removing benzene from the inert vapor prior to venting the inerts to the atmosphere, such as for example, the absorption of benzene with a liquid organic solvent lower boiling than said inerts; the chilling or refrigeration of the vaporous mixture to condense benzene from inerts or a combination of absorption and chilling or refrigeration, wherein the solvent absorbs the organic material and the inert vapors leaving the absorption mixture are chilled to condense and recover any organics entrained therein prior to venting to the atmosphere.

The halogenation reaction, preferably a chlorination reaction, is carried out at temperatures between about 300° F. and about 850° F. in the presence of a metal catalyst. The metal catalyst employed to promote the chlorination is usually a metal halide, e.g., iron chloride or copper chloride, when the hydrogen halide reactant is hydrogen chloride. When hydrogen bromide is reacted with benzene, the corresponding brominated catalyst can be employed. This reaction in the halogenation or chlorination zone results in a mixture of mono- and polyhalogenated, or preferably chlorinated, benzenes together with a substantial quantity of unconverted benzene and some aqueous acid and, because a small amount of oxidation takes place, oxides of carbon, nitrogen, and water are also present in this mixture.

In the second phase of this process a mixture of monohalobenzene and steam is fed to a hydrolysis zone wherein under a pressure of between about 10 p.s.i.a. and about 300 p.s.i.g., the material is reacted in the presence of a catalyst to produce phenol and hydrogen halide in admixture with unconverted reactants. The vaporous hydrolysis effluent is then fed to the lower portion of the phenol condensation zone.

The preferred hydrolysis catalyst is a neutral phosphate such as, for example, tricalcium phosphate, but other catalysts of high surface activity may also be employed or substituted if desired. For example, catalysts which may be used include aluminum, silica gel, which may be promoted with copper, nickel or cobalt or any other suitable promoting agent. Other suitable catalysts which may be employed at this stage of the process include aluminum hydrosilicate and catalysts mentioned in U.S. Patent No. 1,966,281 and U.S. Patent No. 1,961,834.

In the phenol condensation zone, the hydrolysis effluent is quenched with the neutralization effluent containing benzene and chlorobenzene. In order to prevent hydrogen halide from condensing, sufficient benzene is introduced into the phenol condensation zone to provide a vaporous mixture of organic to water and hydrogen halide in a mol ratio in the top of the column at least equal to the mol ratio of these components at their heterogeneous azeotropic equilibrium under the conditions of pressure in the top of the column. The temperature at this point is determined by the organic-inorganic equilibrium so that the organic vapor is at the dew point in the top of the column. The mol ratio varies between about 1:1 and about 12:1. The quench column is operated at a pressure of from about 10 p.s.i.a. to about 300 p.s.i.g., preferably from 20 p.s.i.g. to about 100 p.s.i.g., at a temperature of between about 170° F. and about 380° F. In this way conditions are so controlled that the inorganic hydrogen halide-water phase passes through the quench column as a vapor, together with benzene. Simultaneously with the quenching step fractionation occurs in the column with the result that the overhead vapor is essentially free of phenol and the bottoms liquid contains only a small quantity of benzene. This vaporous mixture is heated and recycled to the halogenation reactor as part of the feed thereto; therefore, it is preferable to introduce the fresh benzene feed required in the chlorinator directly into the liquid effluent from the neutralization zone prior to the quenching step. In this way the benzene feeds the chlorinator and also provides vaporizable organics in the phenol condensation.

The bottoms liquid fraction from the quench column is then passed to a fractionator zone for the removal of halobenzene as a net condensed overhead stream, while crude phenol is withdrawn from the bottom of the fractionator and subjected to further purification by distillation. The condensed halobenzene thus separated is vaporized and recycled to the hydrolysis zone. In the above general discussion of the process, hydrogen halide, halogenation and halobenzene have been used in the description to cover the use of any of the halogens in the present process; however, of these halogens or halogenated compounds, the chloride, or chlorine and chlorocompounds are preferred.

Although the system is generally maintained at a pressure between 10 p.s.i.a. and 300 p.s.i.g., it is to be understood that higher or lower pressures may be employed and that the benefit obtained by the present invention is independent of the applied pressure.

In one embodiment of the present invention which results in a separate and additional improvement in the process of producing phenol, the chlorobenzene feed to hydrolysis is treated in a separate and distinctive manner. The portion of monochlorobenzene removed from the fractionator is mixed with the steam required as part of the hydrolysis feed, to substantially lower its vaporization temperature, e.g., by about 70° F. to about 130° F. The combined mixture is then vaporized and recycled to said hydrolysis zone.

In another embodiment of the present invention, the benzene recovery absorption operation of the present invention is performed in a plurality of zones and stages. When a two-stage absorption is used, a primary liquid absorption medium is employed to selectively absorb benzene while inerts are permitted to leave the zone as a vapor; a secondary absorption medium is introduced into the upper portion of the absorber to collect any uncondensed organic materials vaporized from the primary absorption mixture, while allowing the inert inorganic materials to pass out of the absorber as vapors. The primary absorption mixture in this embodiment is monohalobenzene, preferably the monochlorobenzene fraction from the fractionator. Where two absorbents are employed, the secondary absorption mixture can be vaporized and recycled to the hydrolysis zone with the primary mixture.

Still another embodiment comprises employing any of the aforementioned absorption solvents to absorb benzene in a single stage absorption zone and chilling the overhead vapors to condense organic materials and recover the condensate while venting vaporous inert materials to the atmosphere.

A further improvement in this process is realized by operating the neutralization zone in two stages. In this way the chlorination zone effluent is fed to the lower portion, or first stage of the neutralization column wherein it is washed with a caustic solution obtained from the upper portion, or second stage of the neutralization column. Thus, the caustic solution is introduced to the upper portion of the neutralization zone to react with any acidic components leaving the first zone and in this way acts as a barrier to the carryover of acidic components in other stages of the process. At least a portion of this caustic solution is removed and is preferably recycled to the second zone, while the remaining portion is withdrawn from the second zone and introduced to the first zone where a major part of the neutralization takes place. To prevent a build-up of water and sodium chloride in the lower zone, a portion of the aqueous solution is withdrawn from the neutralizer and replenished with caustic.

When the neutralization zone is employed solely for neutralization purposes, the chlorination effluent may be neutralized in the vapor state, the neutralized vapors condensed and the resulting condensate passed to the phenol condensation zone.

A convenient method for supplying chlorinator feed from the phenol condensation zone which is substantially free of chlorobenzene, comprises providing an additional fractionating zone at the top of the quench column and a zone wherein distillation is effected after the chlorination zone. The quench column normally provides fractionation of these components; however, in some instances, it is desirable to further refine the overhead vapors in order to reduce the formation of by-products in the chlorination reaction. In this modification, the neutralized benzene-rich vapor from the distillation zone is condensed and a portion is employed to reflux the fractionation section of the quench column. The other portion is used to reflux the distillation zone that is fed with vapors from the chlorinator. The chlorination product is thus concentrated in the liquid organic product of the distillation zone which is subsequently passed to the quench column below the additional fractionation section. The distillation of the vaporous chlorinator effluent can be conducted before, after or simultaneously with the neutralization operation.

The benzene feed required in the system is introduced into the condensed vaporous overhead from said neutralization zone. This benzene feed serves to replenish the benzene consumed in the halogenation reaction and to maintain the high ratio of organic material in the system which is necessary for control of the temperature over a narrow range of, for example, 25° F. to 100° F. in the chlorination zone and which aids in preventing the condensation of halide acid in the phenol condensation zone by providing the preferred excess of organic material in the vapors leaving this zone. Thus, the amount of benzene recycled in the system is largely dependent upon the pressure under which the phenol condensation zone is operated.

When the quench column is operated at low pressures in the order of between about 10 p.s.i.a. to about 60 p.s.i.g., the quantity of benzene required in the vapor is such that the heat content of the hydrolysis reaction effluent is not sufficient to vaporize all the benzene required. Under these circumstances the benzene required can be provided by any convenient method, for example, injecting benzene vapor into the lower quench column or into the hydrolysis reaction feed or effluent streams, or by providing heat injection into the quench column by conventional means, such as a steam heated reboiler.

By operating according to the teachings of the present invention described above, the acid produced in the process is maintained in the vapor phase until it is consumed in the chlorination reaction or neutralized in the subsequent neutralization stage; the need for excessive equipment, i.e., aqueous hydrogen halide storage and vaporization equipment, phenol-water-benzene extraction columns, fractionator columns and blowers, to circulate reactants are obviated. In addition, the need to use equipment of special corrosive resistant materials, such as glass, is also eliminated. Advantageously, this invention permits convenient operation under pressure with the resultant reduction in size of equipment and piping handling the vaporous materials. Due to the molar excess of benzene under which the process is conducted, better temperature control is realized in the chlorination zone which factor, in turn, reduces the formation of by-products in the chlorination reaction to a minimum and increases the yield of phenol from benzene. In addition to the above improvements, it is also found that the loss of solvent in the benzene absorber can be greatly reduced when operating under elevated pressure and the benzene condensation step can be conducted using an air-cooled heat exchange thereby substantially reducing the cooling water requirement.

For a better understanding of the present invention, reference is now had to the accompanying drawing which represents a specific design for carrying out the production of phenol by chlorination and hydrolysis according to the teaching of the present invention. It is to be understood, of course, that additional apparatus, for example heat exchangers, reboilers, etc., may be employed in the operation shown, if desired.

In the drawing, air under a pressure of about 40 p.s.i.g., at a temperature of about 350° F., is passed in line 2 at a rate of about 6,800 pounds per hour through a heater (not shown) wherein the temperature of the air is raised to about 600° F. The heated air is then passed through line 6 wherein it is mixed with a vaporous mixture containing benzene, hydrogen chloride and water at a temperature of about 230° F. Additional hydrogen chloride is added to line 6 from line 4 to provide a mixture containing about 35 weight percent of hydrogen chloride or the stoichiometric amount required for the chlorination reaction. The resulting mixture at 240° F. is then heated in heater 8 wherein the temperature of the mixture is raised to about 450° F. This mixture is then passed to chlorination zone 10 packed with a bed of granular catalyst 12 comprising chlorides of iron and copper. The vaporous benzene component undergoes about 2.4 mol percent conversion to monochlorobenzene in the exothermic reaction. The vaporous effluent from the chlorinator or chlorinating zone, comprising a major portion of unconverted benzene, monochlorobenzene and water, together with a trace of hydrogen chloride and a minor portion of polychlorobenzenes and inert materials such as the oxides of carbon and nitrogen, are then introduced into neutralization zone 14 from conduit 16 wherein the material is neutralized by washing with an aqueous 30 percent solution of sodium hydroxide or any other suitable basic material, such as other metal hydroxides, from lines 18 and 20 and is cooled to the organic dew point by washing with an excess of liquid benzene from line 24 hereinafter described. Washing the vapors with benzene results in rectification of the organic materials in the neutralization zone; thus, the vapors leaving the washing zone are enriched in benzene and the liquid leaving the zone is enriched in chlorobenzene.

The neutralization zone is divided into an upper section 22 and a lower section 26. To the upper section defined as a "guard chamber" is added 30 percent caustic solution to neutralize any acidic components leaving section 26. A portion of the caustic is continuously withdrawn from the lower portion of section 22 and a portion of the caustic is introduced into the upper portion of section 26 by means of conduit 20. The remaining portion of caustic is recycled to the upper portion of section 22 by means of conduit 28. A major portion of the neutralization takes place in section 26 wherein the incoming vapors from the chlorinator are first contacted with caustic. The liquid aqueous phase containing caustic and sodium chloride is separated from the organic liquid phase in the bottom of zone 26, and a portion is introduced into the upper portion of zone 26 from line 27. The remaining portion is removed from the system to prevent a build-up of sodium chloride solution. As a result of the washing operation, a portion, i.e., 96,600 pounds per hour of organic liquid material is produced. This liquid material contains benzene and chlorobenzene in a weight ratio of about 13:1.

The liquid organic mixture from the neutralization zone is removed from the bottom of the neutralization zone through line 30 at a temperature of about 220° F., while the remaining vaporous mixture, containing benzene, water and inert materials, together with a small amount of monochlorobenzene is removed from the top of the neutralization zone through line 32 at a temperature of about 219° F. under about 25 p.s.i.g. pressure. This vaporous mixture is then partially condensed by air cooling followed by water cooling in indirect heat exchanger 34 and the resulting condensate, which contains a mixture of benzene and monochlorobenzene, passed to holding drum 36 by means of line 38 wherein it is separated from the uncondensed vapor containing substantially all of the inert materials, together with some benzene and water. Fresh benzene feed from line 35 is admixed with the condensate at a rate of about 4,500 pounds per hour and a portion of the resulting benzene enriched condensate mixture is then recycled to section 26 of neutralizer 14 by means of line 24 as quench for the chlorination gaseous effluent therein. The remaining portion of the condensate is passed through line 42 at about 212° F. to the top of quench column 40 operated under about 35 p.s.i.g. wherein it is employed as reflux to the column. The liquid from the neutralization zone is passed in line 30 to heater 60 wherein it is heated to about 265° F., and then transferred to drum 29, from which a vapor effluent is withdrawn and introduced into the lower section of column 40, in line 56. The liquid effluent is separately withdrawn from drum 29 and passed to an upper section of column 40 above said vapors in line 31.

The inerts are vented from the system without loss of organic materials by passing the uncondensed vaporous mixture from drum 36 through line 43 to the lower section 44 of two-stage absorption column 48 wherein the vaporous benzene is selectively absorbed in a liquid fraction of monochlorobenzene as the primary absorption medium by counter-current contact; the primary absorption medium entering the upper portion of the lower section of the absorber at a temperature of 100° F. The vaporous inert materials are not absorbed by the solvent and are passed upwardly through the column with some entrained monochlorobenzene. Absorption zone 48 also contains an upper section 46 to which a secondary absorption liquid is passed. The secondary liquid selectively absorbs any of the organic components of the vapors leaving section 44 by counter-current contact and the inert vaporous materials comprising oxides of carbon and nitrogen, water and oxygen pass upwardly through section 46 and are vented from the top of zone 48 to the atmosphere through line 49. The benzene absorber is operated under a pressure of 19 p.s.i.g. at a temperature of between about 100° F. and about 170° F.

The secondary absorption mixture is withdrawn from the bottom of section 46 of zone 48 by means of conduit 45 from which components useful in the process may be recovered and recycled, if desired. The primary absorption mixture is withdrawn from the bottom of section 44 of zone 48 by means of conduit 52, vaporized in the presence of steam and passed to the hydrolysis zone.

About 66,000 pounds per hour of a vaporous mixture comprising about 69 percent monochlorobenzene, 28 percent water and 3 percent benzene is fed through conduit 52 at a temperature of about 932° F. to hydrolysis zone 50 where in the presence of a bed of granular phosphate catalyst, the conversion to phenol takes place in the vapor phase and hydrogen chloride is reformed. The resulting vaporous hydrolysis effluent is then introduced at a temperature of about 932° F. to the bottom of the quenching column 40 referred to above from line 58. The vaporous hydrolysis effluent contains, in addition to 6 percent by weight of phenol, 3 percent by weight of benzene, 3 percent by weight of hydrogen chloride, 27 percent by weight of water, and 61 percent by weight of chlorobenzene. Therefore, the total capacity of this operation is about 4,000 pounds per hour of phenol.

In the quench column fractionation takes place resulting in the separation of a liquid stream containing a major portion of the phenol and the chlorobenzenes in the bottom of the column at a temperature of about 330° F. and 36 p.s.i.g. while a vaporous effluent containing a major portion of the benzene, inerts, water and hydrogen chloride, remains as a vapor in the top portion of the column at a temperature of about 230° F. and a pressure of about 35 p.s.i.g.

Approximately 96,600 pounds per hour of liquid neutralization effluent and about 92,000 pounds per hour of benzene enriched condensate is fed to column 40 to provide and maintain an excess of organic components in the vapors leaving the column of about 10 percent excess of that dictated by the heterogeneous azeotrope of benzene-water-chlorobenzene-hydrogen chloride. Thus, conditions in this column are adjusted to prevent the condensation of the water-hydrogen chloride components of the hydrolysis effluent at any time in the quench column. The amount of organic materials in the vapor at the azeotrope equilibrium varies inversely with the pressure. The amount of organic material in the vapor is adjusted by increasing or decreasing the amount of benzene fed to the quench column from drum 36. The vaporous fraction removed from column 40 through line 6 at 230° F. is recycled to the chlorinator after being admixed with fresh hydrogen chloride and air feed and heated as part of the chloride feed thereto as hereinabove described. An advantage attained by adding hot air or oxygen proximate the point of withdrawal of vapors from the phenol condensation zone is that the temperature of the vapors is raised, thus insuring against any condensation of vapors in the piping.

The liquid effluent at 330° F. which is removed from the bottom of the quench column is neutralized and passed to fractionator 66 by means of line 62. In the fractionator a vaporous fraction, predominately monochlorobenzene and containing less than 2 percent by weight of benzene is separated. This vapor is removed from the top of zone 66 by conduit 68, condensed in condenser 70 by indirect heat exchange with water and the condensate collected in drum 72. A portion of the resulting condensate material (about 14 per cent) is passed by means of line 74 to cooler 76 where it is cooled to about 100° F., then passed to absorber 48 as the primary extraction medium where it serves to absorb benzene and is subsequently withdrawn, vaporized in the presence of steam and passed to the hydrolysis zone as described above. Half of the remaining portion of condensate is passed through by-pass line 47 from which it is admixed with the liquid absorption mixture leaving zone 48 and the remaining portion of condensate is used to reflux the fractionator.

Crude phenol from the bottom of the chlorobenzene fractionator is removed as a liquid through line 78 and passed to a phenol purification and recovery system.

It is to be understood that in the above drawing, incidental equipment such as pumps, some heat exchangers, etc., have been omitted for the sake of simplicity. For example, the chlorination effluent in line 16 may be cooled before entry into the neutralization zone by indirect heat exchange with the recycle feed stream to the chlorinator in line 6, and also by indirect heat exchange with the liquid material withdrawn from the neutralization zone in line 30 prior to entry into the quench column. The vaporous stream leaving the neutralizer may also undergo an additional condensation step to remove additional quantities of benzene prior to entry into the absorption zone, if desired. Generally, it has been found advantageous to utilize heat exchange between streams entering and leaving a particular zone; hence, the primary absorption solvent in line 74 is advantageously passed in indirect heat exchange with the primary absorption mixture leaving the absorber in line 52 and this method of conserving heat energy may be employed wherever convenient at other stages of the process.

Of special interest in the present process for the conservation of heat energy, is a novel method of utilizing various process streams to condense and vaporize the vaporous effluent withdrawn from fractionator 66 in line 68. In this operation only a portion of the vaporous effluent is condensed in condenser 70 and the other portion is separately passed in indirect heat exchange with the hydrolysis feed mixture in line 52.

The organic hydrolysis feed is mixed with steam to lower its vaporization temperature and is then passed in indirect heat exchange with the vaporous overhead from zone 66. Both portions of the vaporous effluent from fractionator 66 are then collected in drum 72 and refluxed or passed to zone 50. In this way, the monochlorobenzene vapors can be vaporized at a pressure higher than the fractionator pressure using the heat liberated by condensing monochlorobenzene vapors from the fractionator. This result is achieved by mixing the hydrolysis feed liquid with the steam required in the hydrolysis reaction. The addition of steam serves to lower the vaporization temperature of the monochlorobenzene below the condensing temperature dictated by the pressure employed in the fractionation zone.

It is also to be understood that many other modifications and variations of the above-described process can be made without departing from the scope of this invention; for instance in the above example, hydrogen bromide may be substituted for hydrogen chloride in the halogenation zone and monobromobenzene produced may be employed in the hydrolysis zone to provide the corresponding hydrogen bromide in the manner set forth above for chlorinated compounds. Also a substituted benzene, as for example, methylbenzene, can be substituted in the foregoing discussion for benzene to yield the corresponding methylchlorobenzene, and this product treated in the manner set forth above to produce the corresponding cresol product.

Having thus described my invention, I claim:

1. A process for producing phenol which comprises: chlorinating benzene with hydrogen chloride in the presence of oxygen in a chlorinating zone to produce a vaporous mixture containing a monochlorobenzene, benzene, inorganic oxides and hydrogen chloride; passing the vaporous chlorination effluent to a neutralization zone wherein hydrogen chloride is neutralized with a basic solution; partially condensing the chlorination vapors to separate a first liquid mixture containing monochlorobenzene and benzene from a first vaporous mixture containing the inorganic oxides, water and benzene; condensing benzene from the first vaporous mixture as a second liquid condensate; adding a controlled amount of fresh benzene to the second liquid condensate; passing a controlled amount of the benzene-enriched second liquid condensate to the top portion of a phenol condensation zone for vaporization therein; partially vaporizing by heating said first liquid mixture to separate a liquid fraction and a vapor fraction; passing the liquid fraction to the phenol condensation zone at a point below entry of said benzene-enriched liquid condensate, passing the vapor fraction to the phenol condensation zone at a point below entry of said liquid fraction; hydrolyzing monochlorobenzene with steam in a hydrolysis zone to produce a vaporous hydrolysis effluent containing phenol, water and hydrogen chloride; passing said vaporous hydrolysis effluent to said phenol condensation zone at a point below entry of said vapor fraction; maintaining said phenol condensation zone at a point below entry of said vapor fraction; maintaining said phenol condensation zone at a temperature above the dew point of the hydrogen chloride-water mixture in the hydrolysis effluent and under a pressure of from 20 p.s.i.g. to 100 p.s.i.g.; supplying benzene to the top of said phenol condensation zone in an amount in excess, but less than 25 percent excess, of the amount required for the formation of the benzene - monochlorobenzene - water-hydrogen chloride azeotrope by adjusting said controlled amount of fresh benzene added to the second liquid condensate and also by controlling said amount of benzene-enriched second liquid condensate introduced into the top portion of the phenol condensation zone; continuously removing a vaporous mixture of benzene-monochlorobenzene-water-hydrogen chloride from said phenol condensation zone and at all times preventing the condensation of a water-hydrogen chloride mixture by maintaining said excess of benzene in said phenol condensation zone; withdrawing a liquid phenol-monochlorobenzene liquid fraction from said phenol condensation zone; separating the monochlorobenzene from the phenol and passing said monochlorobenzenet to said hydrolysis zone as at least part of the feed thereto; and recovering phenol as a product of the process.

2. In a process for the production of a phenol wherein a benzene is reacted with a halogen ion to produce a monohalobenzene and the monohalobenzene is hydrolyzed with steam to produce a vaporous mixture comprising the phenol, water, and the corresponding hydrogen halide, the improvement which comprises: passing the vaporous hydrolysis effluent to a phenol condensation zone, supplying said benzene to the phenol condensation zone in an amount of at least that required for the formation of the corresponding benzene-monohalobenzene-water-hydrogen halide azeotrope, condensing phenol vapors in the phenol condensation zone at a temperature above the dew point of the hydrogen halide-water mixture in said zone, maintaining a mixture of the benzene, water, the hydrogen halide and the monohalobenzene in the vapors leaving the phenol condensation zone and recovering phenol as a product of the process.

3. In a process for the production of a phenol wherein a benzene is reacted with a halogen ion to produce a monohalobenzene and the monohalobenzene is hydrolyzed with steam to produce a vaporous mixture comprising the phenol, water and the corresponding hydrogen halide, the improvement which comprises: passing the vaporous hydrolysis effluent to a phenol condensation zone, supplying said benzene to the phenol condensation zone for vaporization therein in excess of the amount required for the formation of the corresponding benzene-monohalobenzene-water-hydrogen halide azeotrope up to a 25 percent excess of that amount, removing vapors from the phenol condensation zone while condensing phenol at a temperature above the dew point of the hydrogen halide-water mixture in said zone, maintaining a mixture of the benzene, the monohalobenzene, water and substantially all of the hydrogen halide in the vapors leaving the phenol condensation zone, and recovering phenol from the condensate as a product of the process.

4. The process of claim 3 wherein an unsubstituted phenol is a product and unsubstituted benzene is added to the phenol condensation zone.

5. The process of claim 3 wherein cresol is a phenol and methylbenzene is added to the phenol condensation zone.

6. In a process for the production of phenol wherein benzene is catalytically reacted with a hydrogen halide in the presence of oxygen to produce a monohalobenzene in a halogenation zone and the monohalobenzene is hydrolyzed with steam in the presence of a catalyst to produce a vaporous mixture of water, phenol, and the hydrogen halide in a hydrolysis zone, and the phenol is recovered as a product of the process, the improvement for the recovery of phenol which comprises: passing the vaporous hydrolysis effluent to a phenol condensation zone; supplying benzene to the phenol condensation zone for vaporization therein in at least the amount required for the formation of the corresponding monohalobenzene-benzene-water-hydrogen halide azetrope; removing vapors from the phenol condensation zone while condensing the phenol at a temperature above the dew point of the hydrogen halide-water mixture in the phenol condensation zone; maintaining a mixture of benzene, water, and substantially all of the hydrogen halide in the vapors leaving the phenol condensation zone; recovering phenol from the condensate as the product of the process; injecting oxygen at an elevated temperature into the vapors from the phenol condensation zone to maintain the vapor phase and to prevent condensation of corrosive hydrogen halide-water mixture, and passing said oxygen-injected vapors to the halogenation zone as feed thereto.

7. In a process for the production of phenol wherein a monohalobenzene is hydrolyzed with steam in the presence of a catalyst to produce a vaporous mixture containing phenol, the monohalobenzene, water and the hydrogen halide in a hydrolysis zone, the improvement which comprises: passing the vaporous hydrolysis effluent to a phenol condensation zone operated under a pressure of between about 20 p.s.i.g. and about 100 p.s.i.g. and at a temperature above the dew point of the hydrogen halide-water mixture in the phenol condensation zone so that the condensation of said mixture is avoided at all times during the operation of the phenol condensation zone; supplying benzene to the phenol condensation zone for vaporization therein in excess of the amount required for the formation of the corresponding monohalobenzene-benzene-water-hydrogen halide azeotrope; removing vapors from the phenol condensation zone while condensing phenol and the monohalobenzene; maintaining a mixture of benzene, water, and substantially all of the hydrogen halide in the vapors leaving the phenol condensation zone; fractionating the vapors in the upper portion of the phenol condensation zone to separate entrained monohalobenzene as a liquid from the vapors and recovering phenol from the condensate as a product of the process.

8. The process of claim 7 wherein hot air is injected into the vapors withdrawn from the phenol condensation zone to maintain the benzene-monohalobenzene-water-hydrogen halide mixture in the vapor phase and recycling the air-enriched vapors to the chlorinating zone.

9. In a process for the production of phenol wherein benzene is catalytically reacted in the vapor phase in a halogenation zone with hydrogen halide in the presence of oxygen to produce a vaporous mixture containing monohalobenzene, benzene, inorganic inert materials and the hydrogen halide, the monohalobenzene is catalytically hydrolyzed with steam to produce a vaporous mixture of water, phenol and the hydrogen halide in a hydrolysis zone and the phenol is recovered from the hydrolyzed vaporous mixture, the improvement which comprises: passing the vaporous effluent from the halogenation zone to a neutralization zone where the vapors are simultaneously neutralized with a basic solution and the organic components are condensed and separated from a vaporous fraction containing benzene and the inorganic inert materials; passing the condensed organic components to a phenol condensation zone; separating benzene from the inorganic inert materials; passing the vaporous hydrolysis effluent to the phenol condensation zone; passing benzene to the top of the phenol condensation zone for vaporization therein in an amount in excess of that required for the formation of the corresponding monohalobenzene-benzene-water-hydrogen halide azeotrope; removing vapors from the phenol condensation zone while condensing phenol and monohalobenzene at a temperature above the dew point of the hydrogen halide-water mixture in the phenol condensation zone; maintaining a mixture of benzene, water the monohalobenzene and substantially all of the hydrogen halide in the vapors leaving the phenol condensation zone; recovering phenol from its mixture with monohalobenzene as the product of the process; and passing the monohalobenzene to the hydrolysis zone as feed thereto.

10. The process of claim 9 wherein sufficient benzene is introduced into the phenol condensation zone to provide a mol ratio of between 1:1 and about 12:1 organics to hydrogen halide-water mixture in the vapors leaving the phenol condensation zone.

11. The process of claim 9 wherein the phenol condensation zone is reboiled by passing the liquid neutralization effluent through a heater to partially vaporize the effluent, feeding the remaining liquid to the upper portion of the phenol condensation zone and passing the resulting vapors to the lower portion of the phenol condensation zone, said phenol condensation zone being operated at a temperature of between about 170° F. and about 380° F.

12. The process of claim 9 wherein benzene is separated from inorganic inert materials by adsorption of the benzene in a solution of the monohalobenzene, the adsorption mixture is recovered and passed to the hydrolysis zone and the inorganic materials are vented to the atmosphere.

13. The process of claim 9 wherein benzene is separated from the inorganic inert materials by chilling to condense benzene from the vaporous inerts.

14. In a process for the production of phenol wherein benzene is reacted in the vapor phase with a halogen ion in a halogenation zone to produce a vaporous halogenation effluent containing benzene, monohalobenzene, inert materials and hydrogen halide, the monohalobenzene is hydrolyzed with steam to produce a vaporous mixture containing phenol and hydrogen halide in a hydrolysis zone, and the phenol is recovered from said vaporous hydrolysis mixture, the improvement which comprises: passing the vaporous halogenation effluent to a neutralization and fractionation zone wherein the vapors are neutralized with an aqueous caustic solution and a benzene-monohalobenzene mixture is separated as a liquid from a vaporous mixture free of monohalobenzene and containing benzene, water and inerts; separating benzene from the inert materials by condensation of the benzene; passing a portion of the separated benzene to the neutralization zone as reflux to provide fractionation therein and to concentrate monohalobenzene in the liquid; passing the neutralized liquid to an intermediate section of a phenol condensation zone; passing the vaporous hydrolysis effluent to a lower section of the phenol condensation zone; passing the remaining portion of the benzene separated from said inert materials to the top section of the phenol condensation zone wherein fractionation of vaporous components is effected with vaporizing benzene prior to withdrawal of vapors from said phenol condensation zone; supplying benzene to the top section of the phenol condensation zone in excess of the amount required for the formation of the benzene-monohalobenzene-hydrogen halide-water azeotrope and to avoid condensation of a hydrogen halide-water mixture at all times during the operation of the phenol condensation zone; removing a vaporous mixture containing benzene, water, and substantially all of the hydrogen halide from the top of the phenol condensation zone while condensing phenol and monohalobenzene at a temperature at least as high as the dew point of the hydrogen halide-water mixture in said phenol condensation zone; passing the vaporous phenol condensation zone effluent to the halogenation zone as feed thereto; and recovering phenol from the condensate as the product of the process.

15. In the process for neutralizing the corrosive vaporous effluent obtained from a halogenation zone wherein a benzene is reacted with a hydrogen halide in the presence of oxygen to produce a vaporous mixture containing the unreacted benzene, the corresponding monohalobenzene, inorganic inert materials and the hydrogen halide, the improvement which comprises: passing the halogenation effluent into a lower zone of a multi-stage neutralizer; partially condensing and washing said effluent with a basic washing medium to condense the monohalobenzene and to neutralize said condensate; passing the remaining vaporous material to an upper zone of a multi-stage neutralizer; introducing a basic solution into said upper zone and neutralizing therein any acidic vapors from said lower zone; passing at least a portion of the resulting liquid basic solution from the upper zone to the lower zone as the washing medium therein; withdrawing a liquid mixture substantially free of inorganic inerts and containing substantially all of the monohalobenzene and the benzene from the lower zone of the neutralizer; and withdrawing from the upper zone of the neutralizer a vaporous mixture containing the benzene and concentrated in water and inorganic inert materials, said mixture being substantially free of corrosive hydrogen halide.

16. The process of claim 15 wherein the vaporous mixture containing the benzene, water and inerts is cooled to condense benzene and water from vaporous inerts, and the condensate is refluxed to the lower neutralization zone to effect fractionation therein and concentrate monohalobenzene in the condensate while enriching the vapors in benzene.

17. In a process for the production of phenol wherein benzene is catalytically reacted in the vapor phase in a halogenation zone with hydrogen halide in the presence of oxygen to produce a vaporous mixture containing monohalobenzene, benzene, inorganic inert materials and the hydrogen halide, the monohalobenzene is catalytically hydrolyzed with steam to produce a vaporous mixture of water, phenol and the hydrogen halide in a hydrolysis zone and the phenol is recovered from the hydrolyzed vaporous mixture, the improvement which comprises: passing the vaporous effluent from the halogenation zone to a neutralization zone where the vapors are simultaneously neutralized with a basic solution and the organic components are condensed and separated from a vaporous fraction containing benzene and the inorganic inert materials; passing the condensed organic components to a phenolic condensation zone; passing the vaporous hydrolysis effluent to the phenol condensation zone; passing benzene to the top of the phenol condensation zone for vaporization therein in an amount in excess of that required for the formation of the corresponding monohalobenzene-benzene-water-hydrogen halide azeotrope; separating benzene from the inorganic inert materials by absorbing benzene in a liquid organic solvent suitable for extracting benzene from its mixture with inorganic inert materials and lower boiling than said inert inorganic materials; withdrawing the unabsorbed vapors comprising the inert inorganic materials and chilling the vapors to at least the condensation temperature of the solvent and above the condensation temperature of the inert inorganic materials to condense any organic material entrained in the vapor; removing the remaining inert inorganic vaporous material from the process and passing the solvent containing benzene to the hydrolysis zone; removing vapors from the phenol condensation zone while condensing phenol and monohalobenzene at a temperature above the dew point of the hydrogen halide-water mixture in the phenol condensation zone; maintaining a mixture of benzene, water, the monohalobenzene and substantially all of the hydrogen halide in the vapors leaving the phenol condensation zone; recovering phenol from its mixture with monohalobenzene as the product of the process; and passing the monohalobenzene to the hydrolysis zone as feed thereto.

18. The process of claim 17 wherein monohalobenzene is a solvent.

19. In a process for the production of phenol wherein a benzene is reacted with a halogen ion to produce a monohalobenzene and the monohalobenzene is hydrolyzed with steam to produce a vaporous mixture comprising phenol, water, and the corresponding hydrogen halide in a hydrolysis zone, the improvement which comprises: passing the vaporous hydrolysis effluent to a phenol condensation zone; removing vapors from the phenol condensation zone while condensing phenol and the monohalobenzene at a temperature above the dew point of the hydrogen halide-water mixture in the phenol condensation zone and supplying said benzene to the phenol condensation zone for vaporization therein in at least the amount required for the formation of the corresponding monohalobenzene-benzene-water-hydrogen halide azeotrope to maintain the hydrogen halide in the vapor phase at all times during the operation of the phenol condensation zone and to maintain a mixture of benzene, water, the monohalobenzene and the hydrogen halide in the vapors leaving the phenol condensation zone; passing the liquid phenol-monohalobenzene fraction from said phenol condensation zone to a fractionation zone wherein monohalobenzene is separated as a vapor from liquid phenol, withdrawing and condensing said monohalobenzene vapors from said fractionation zone; injecting steam which is required for hydrolysis into at least a major portion of said condensed monohalobenzene to lower the vaporization temperature thereof; vaporizing and passing the resulting steam-monohalobenzene mixture to said hydrolysis zone as feed thereto and recovering liquid phenol from said fractionation zone as a product of the process.

20. The process of claim 19 wherein the major portion of condensate into which steam is injected is passed in indirect heat exchange with vapors leaving said fractionating zone prior to passing said steam-enriched condensate to said hydrolysis zone.

References Cited by the Examiner
UNITED STATES PATENTS

| | | | |
|---|---|---|---|
| 1,735,327 | 11/1929 | Lloyd et al. | 260—629 |
| 1,858,521 | 5/1932 | Putnam | 260—650 |
| 2,035,917 | 3/1936 | Prahl et al. | 260—629 |
| 2,156,402 | 5/1939 | Prahl | 260—629 |
| 2,988,573 | 6/1961 | Siebentritt et al. | 260—629 |

LEON ZITVER, *Primary Examiner.*

CHARLES B. PARKER, *Examiner.*

H. G. MOORE, D. R. MAHANAND, J. E. EVANS,
*Assistant Examiners.*